United States Patent [19]

Rishel et al.

[11] Patent Number: 4,586,590

[45] Date of Patent: May 6, 1986

[54] ADJUSTABLE VEHICLE BRAKE PROPORTIONING SYSTEM

[75] Inventors: Paul E. Rishel, Mt. Clemens; Allan D. LaGrou, Rochester; Thomas E. Seefried, Washington, all of Mich.

[73] Assignee: General Motors Corporation, Detroit, Mich.

[21] Appl. No.: 697,770

[22] Filed: Feb. 4, 1985

[51] Int. Cl.⁴ ............................................ B60T 11/08

[52] U.S. Cl. ..................................... 188/345; 188/349; 60/581

[58] Field of Search ........... 188/345, 349, 303, 204 R, 188/156, 157; 303/6 R; 60/581

[56] References Cited

U.S. PATENT DOCUMENTS 3,142,965 8/1964 Hazelbaker ........................... 60/581
3,220,189 11/1965 Caramanna ..................... 188/345 X
3,642,328 2/1972 Holland .......................... 188/345 X
3,978,669 9/1976 Belart ............................. 188/345 X

*Primary Examiner*—Duane A. Reger
*Assistant Examiner*—Lawrence J. Goffney, Jr.
*Attorney, Agent, or Firm*—D. D. McGraw

[57] ABSTRACT

Two separate hydraulic master cylinders are connected with pressure lines to the front and rear brake cylinders. These two master cylinders are mechanically connected together by an articulating balance bar, all of which is mounted on a slidable mounting bracket. The mounting bracket is slidably movable by a reversible electric motor driving a worm gear that is connected to the mounting bracket. The relative position of the mounting bracket on its mounting plate in relation to the input point of a push rod determines the proportioning ratio of the two master cylinders. The assembly may be moved to obtain any proportioning ratio from 100% front brake to 100% rear braking.

1 Claim, 1 Drawing Figure

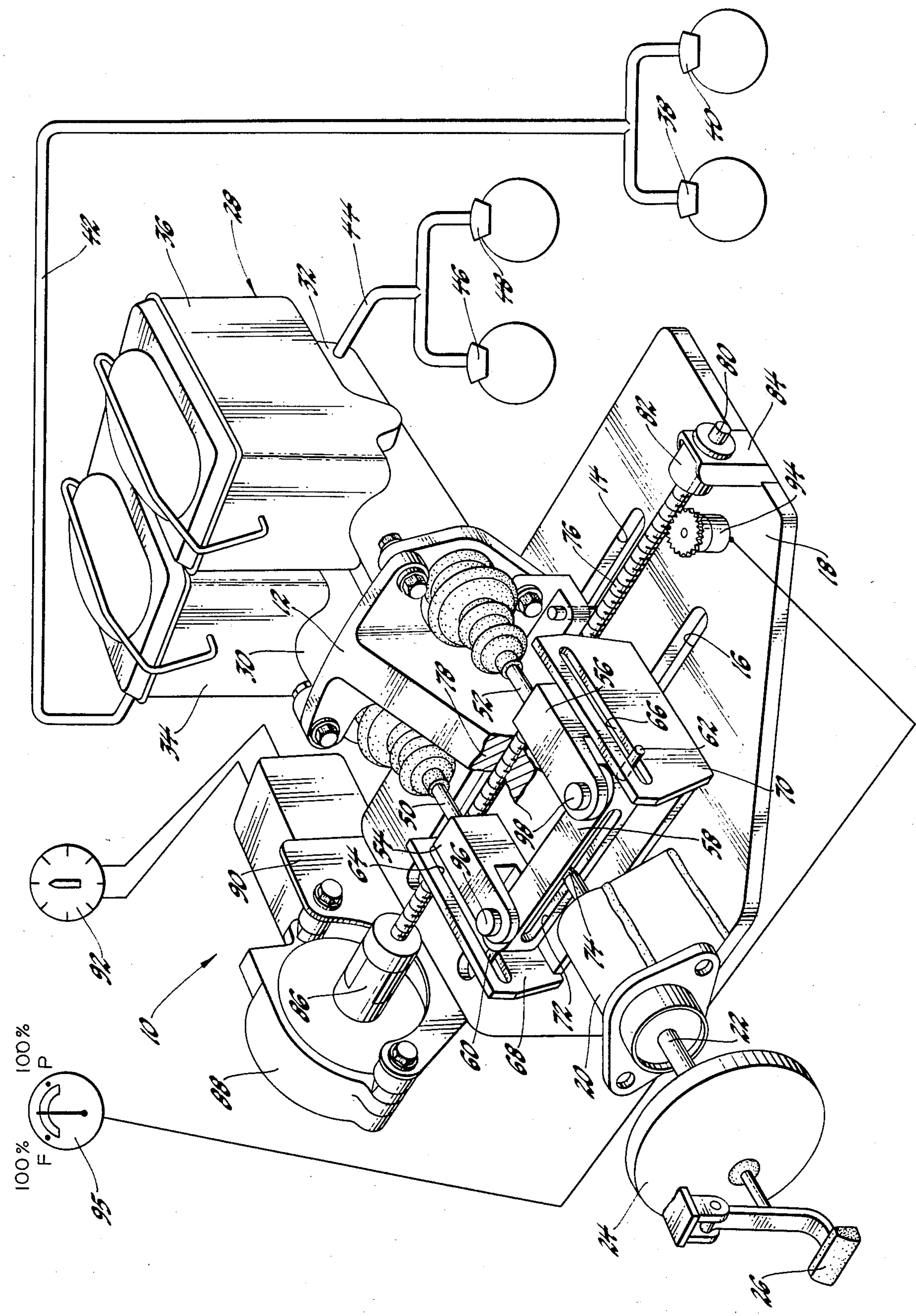
100%
F
100%
P

ADJUSTABLE VEHICLE BRAKE PROPORTIONING SYSTEM

The invention relates to a variable ratio brake balance device which permits changes of the proportioning ratios of the brake pressures to different brake sets from a range of 100% front braking to 100% rear braking. The system is particularly useful in determining the desired brake proportioning ratio for various braking systems as an integral part of brake development programs. It is also useful in vehicles in which the proportioning ratio between front and rear braking requires substantial change due to changes in loading, for example.

The system embodying the invention includes two separate hydraulic master cylinders which are connected by pressure lines to the front and rear wheel brakes. These two master cylinders are mechanically connected together by an articulating balance bar. This assembly is mounted on a bracket that slides laterally in slots in a mounting plate. The unit is slidably driven by a motor driving a worm gear that is connected to the master cylinder mounting bracket. The relative position of the mounting bracket on the mounting plate is measured by an electric potentiometer which drives a meter inside the vehicle. The position of the master cylinder mounting bracket is controlled by a control mechanism such as a switch inside the vehicle. With the articulating balance beam mechanism and the ability to move the bracket and master cylinder assembly laterally relative to the brake booster output rod, proportioning at any ratio from 100% front rear braking, to 100% rear braking is possible.

IN THE DRAWING

The single Figure of the drawing is a perspective schematic view of a system embodying the invention, with parts broken away and in section.

The adjustable brake proportioning system 10 of the drawing has a sliding mounting bracket 12 slidably secured by means of slots 14 and 16 and suitable arrangements such as T-nuts extending through the slots to a fixed mounting plate 18. Mounting plate 18 includes a brake booster output push rod guide 20 through which the brake booster output push rod 22 extends. The brake booster 24 is suitably positioned to be actuated by the vehicle operator by means of brake pedal 26.

The master cylinder assembly 28 includes two parallel master cylinders 30 and 32, each of which is secured to the mounting bracket 12. A brake fluid reservoir 34 is provided for master cylinder 30 and a brake fluid reservoir 36 is provided for master cylinder 32. The outlet of master cylinder 30 is connected to an axle brake set such as the rear brakes 38 and 40 by means of a pressure line or conduit 42. Thus the rear brake circuit includes the master cylinder 30, the pressure line 42 and the rear brakes 38 and 40. Master cylinder 32 is connected by pressure line or conduit 44 to another brake axle set, such as front wheel brakes 46 and 48. Thus the front wheel brake circuit includes the master cylinder 32, the pressure line 44, and the front wheel brakes 46 and 48. Master cylinder input push rod 50 is connected to actuate master cylinder 30 and master cylinder input push rod 52 is connected to actuate master cylinder 32. A clevis 54 is on the input end of push rod 50 and another clevis 56 is on the input end of push rod 52. Clevises 54 and 56 are pivotally pinned to a balance bar 58 at opposite ends of the balance bar. The balance bar opposite ends have guide pins 60 and 62 extending through slots 64 and 66 of guide plates 68 and 70, respectively. The guide plates 68 and 70 are also secured to the mounting bracket 12 for lateral movement therewith. Balance bar 58 has a groove 72 formed in its rear face and extending laterally across the bar face from clevis 54 to clevis 56. The forward end 74 of the booster push rod 22 extends into groove 72 so that the balance bar may be laterally moved while keeping the push rod end 74 in that groove at all times.

A worm drive adjustment screw 76 extends transversely through the mounting bracket 12 and is threaded therein in drive relation at 78. One end 80 of screw 76 is provided with a thrust bearing 82 abutting a mounting bracket 84 on mounting plate 18 and the other end of the screw 76 is connected by means of a flexible coupling 86 to a drive motor 88. Drive motor 88 is mounted on a bracket 90 which is also secured to mounting plate 18. The drive motor assembly 88 includes a motor and a gear reduction mechanism so that the motor may be energized to rotate in either direction and, through the reduction gearing, rotate the screw 76 at a relatively slow speed to provide for fine lateral adjusting movement of the mounting bracket 12 and therefore of the entire master cylinder assembly as well as the balance bar assembly. The motor assembly 88 may be controlled by a switch 92 mounted so as to be moved by the vehicle operator. Movement of the screw 76 is sensed by a potentiometer 94 which is connected to a meter 95 positioned so as to be observed by the vehicle operator. The meter may be arranged to indicate the proportioning ratio of front to rear braking.

The system is illustrated in the drawing with a brake proportioning balance between the front and rear brakes of about 50% each. Therefore, the push rod end 74 is positioned in groove 72 so that it is equally spaced from the clevis pins 96 and 98 respectively associated with clevises 54 and 56. Therefore actuating force transmitted to the master cylinders through the push rod 22 will be equally distributed by the balance bar 58 and the clevises 54 and 56 to the master cylinder push rods 50 and 52, actuating each of the master cylinders 30 and 32 with the same force. In this instance, the balance bar 58 will move translationally with its guide pins 60 and 62 sliding in slots 64 and 66 for equal distances.

If, for example, the vehicle operator decides to select a different proportioning ratio such that the front brakes 46 and 48 will receive 60% of the braking effort and the rear brakes 38 and 40 will receive 40% of the braking effort, the switch 92 is operated to energize the motor assembly 88 and drive the worm screw 76 so as to move the mounting bracket 12 rightwardly, as seen in the drawing, causing the push rod end 74 to more nearly approach clevis pin 96 and move further away from clevis pin 98 until the distance from the point of contact of the push rod end 74 with the balance bar 58 to the clevis pin 96 is 40% of the total distance between clevis pins 96 and 98 on the balance bar. With the mechanism so adjusted, and the brake booster 24 actuated, the push rod 22 will act on the balance bar 58 and will have 60% of the actuating force transmitted through clevis pin 96 and clevis 54 to the master cylinder 30 through its push rod 50. The remaining 40% of the actuating force will be transmitted through clevis pin 98 and clevis 56 to master cylinder 32 through its push rod 52. Therefore master cylinder 30 will generate more pressure than will master cylinder 32 by a ratio of 60:40. In this type of operation balance bar 58 will not move in translational movement only, but will have its guide pin 60 move further in the brake actuating direction in slot 64 than will its guide pin 62 in its associated slot 66.

It can be readily seen that other proportioning ratios may be obtainable as desired. If for example, if it is desired to have 100% of the braking on the front brakes, the motor assembly is driven so as to move mounting bracket 12 to the right until push rod end 74 is aligned with clevis pin 96 and master cylinder push rod 50. All of the actuating force delivered through push rod 22 is then delivered to the master cylinder 30 and brake fluid is pressurized as only in the front brake circuit to actuate the front brakes 46 and 48. Similarly, if no braking is to occur on the front brakes and all of the braking is to occur by use of the rear brakes, the adjusting screw 76 is rotated until the push rod end 74 is aligned with clevis pin 98 and push rod 52. Then only the master cylinder 32 will be actuated and pressurized brake fluid will be generated only in the rear brake circuit. It is contemplated that the system may be connected with a suitable wheel lock control mechanism to change the proportioning ratio as may be needed. It may also be connected with a load sensing arrangement sensing vehicle load on one axle, such as is commonly found on the rear axle of many trucks. Thus when a heavy load is being carried over the rear axle of the truck, the system may adjust to direct additional braking effort toward the rear brakes and when the load is removed the system may be adjusted to decrease the rear brake effort and relatively increase the front brake effort.

The electrically controlled, infinitely adjustable brake proportioning system which is the subject of the invention can be used to quickly determine the desired balance ratio between the front and rear vehicle brakes of any particular vehicle. It may also be used to continually control and modify the brake proportioning ratio as needed for adjustment due to vehicle loading or for wheel lock control. It is recognized that if it is used for wheel lock control purposes, it will require different drive ratios for the motor assembly 88 so as to obtain the necessary ratio changes within the appropriate time frame needed to function in a wheel lock control system.

The embodiments of the invention in which an exclusive property or privilege is claimed are defined as follows:

1. An adjustable vehicle brake proportioning system comprising:

mounting means secured in fixed relation in a vehicle to be braked;

a guide plate and mount slidably mounted with respect to said mounting means for transverse movements;

first and second master cylinders mounted with respect to said guide plate and mount in axially parallel relation and having input push rods, said master cylinders being adapted to be respectively connected to front and rear wheel brake cylinders;

a balance bar slidably mounted with respect to said guide plate and mount for sliding movement relative thereto substantially perpendicular to the transverse movements of said guide plate and mount;

means connecting one of the ends of said balance bar to one of said master cylinder input push rods and the other of the ends of said balance bar to the other of said master cylinder input push rods in actuating force transmitting relation;

an input member slidably mounted with respect to said mounting means and slidably engaging said balance bar in transverse relation thereto, said input member operably receiving brake actuating forces and transmitting same to said balance bar, the range of engagement of said input member with said balance bar being substantially from the connecting means at the one balance bar end to the connecting means at the other balance bar end;

and means for selectively moving said guide plate and said balance bar and said master cylinders transversely on said mounting means, selecting and establishing a desired ratio between the distances from the point of engagement of said input member with said balance bar and each of the ends which establishes the same ratio of the actuating forces transmitted to actuate each of said master cylinders to vary the brake actuating pressures from said master cylinders to said front and rear wheel brake cylinders accordingly within a range of substantially 100% front pressure and 0% rear pressure to substantially 100% rear pressure and 0% front pressure.

* * * * *